(12) United States Patent  (10) Patent No.: US 8,874,341 B2
Crombez et al.  (45) Date of Patent: Oct. 28, 2014

(54) ELECTRONIC BRAKE ACTUATOR BRAKE-BY-WIRE SYSTEM AND METHOD

(75) Inventors: Dale Scott Crombez, Livonia, MI (US); Daniel Gabor, Canton, MI (US); Adil Khan, Lakeshore (CA); Daniel Tannous, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 12/702,399

(22) Filed: Feb. 9, 2010

(65) Prior Publication Data

US 2011/0160972 A1  Jun. 30, 2011

(51) Int. Cl.
| | | |
|---|---|---|
| G06F 19/00 | (2011.01) | |
| G06G 7/00 | (2006.01) | |
| B60T 13/68 | (2006.01) | |
| B60T 7/04 | (2006.01) | |
| B60T 13/66 | (2006.01) | |
| B60T 13/14 | (2006.01) | |
| B60T 8/40 | (2006.01) | |

(52) U.S. Cl.
CPC ............. *B60T 13/147* (2013.01); *B60T 13/686* (2013.01); *B60T 7/042* (2013.01); *B60T 13/662* (2013.01); *B60T 8/4077* (2013.01)
USPC .................................. 701/70; 701/71; 701/78

(58) Field of Classification Search
USPC .......... 701/69, 70, 71, 78; 180/197, 275, 276; 303/20, 113.3, 114.1, 124
See application file for complete search history.

(56) References Cited

U.S. PATENT DOCUMENTS

| 6,033,039 A * | 3/2000 | Dieringer ................... 303/114.3 |
|---|---|---|
| 2004/0237638 A1* | 12/2004 | Reviol et al. ..................... 73/121 |
| 2006/0131956 A1* | 6/2006 | Matsuura et al. ............. 303/152 |
| 2008/0196983 A1* | 8/2008 | Von Hayn et al. ............ 188/156 |
| 2008/0231109 A1* | 9/2008 | Yamada et al. .................. 303/20 |
| 2008/0255732 A1* | 10/2008 | Yasui et al. ...................... 701/48 |
| 2009/0255746 A1* | 10/2009 | Boesch .......................... 180/197 |
| 2010/0050857 A1* | 3/2010 | Feick et al. ...................... 91/361 |

* cited by examiner

*Primary Examiner* — Khoi Tran
*Assistant Examiner* — Jorge Peche
(74) *Attorney, Agent, or Firm* — David Kelley, Esq.; Tung & Associates

(57) ABSTRACT

An electro-hydraulic brake-by-wire system includes a brake pedal, an electronic booster coupled to the brake pedal, a master cylinder coupled to the electronic booster, at least one hydraulic brake circuit disposed in fluid communication with the master cylinder, at least one front hydraulic brake disposed in fluid communication with the at least one hydraulic brake circuit and at least one rear hydraulic brake disposed in fluid communication with the at least one hydraulic brake circuit.

16 Claims, 2 Drawing Sheets

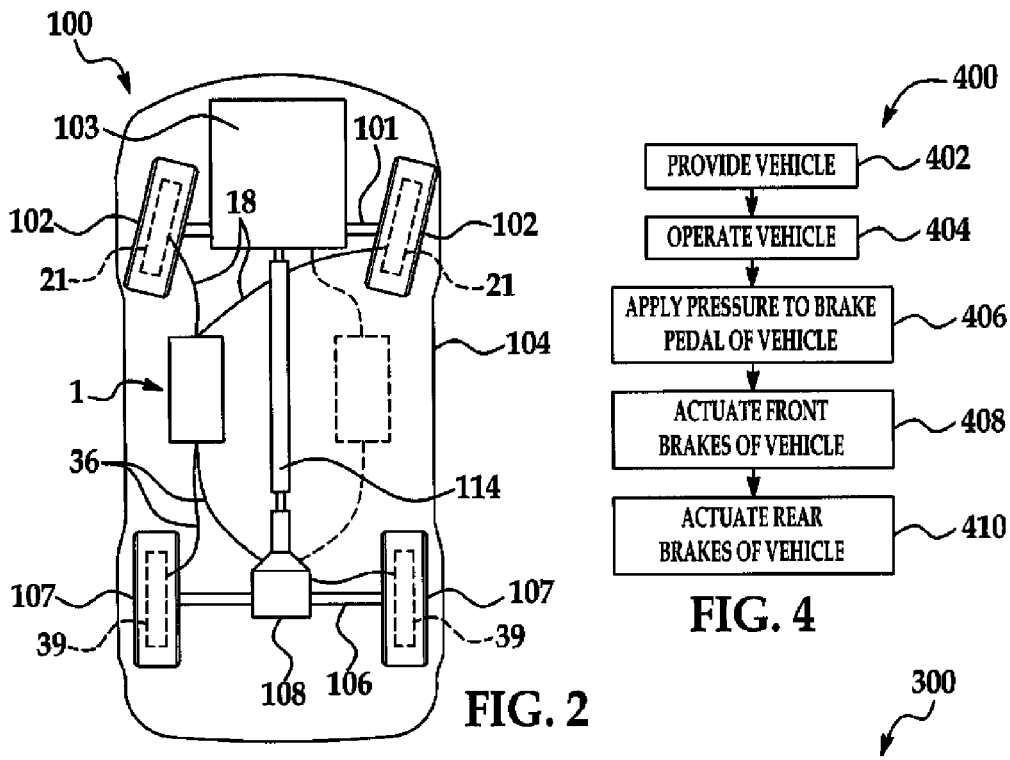
FIG. 2
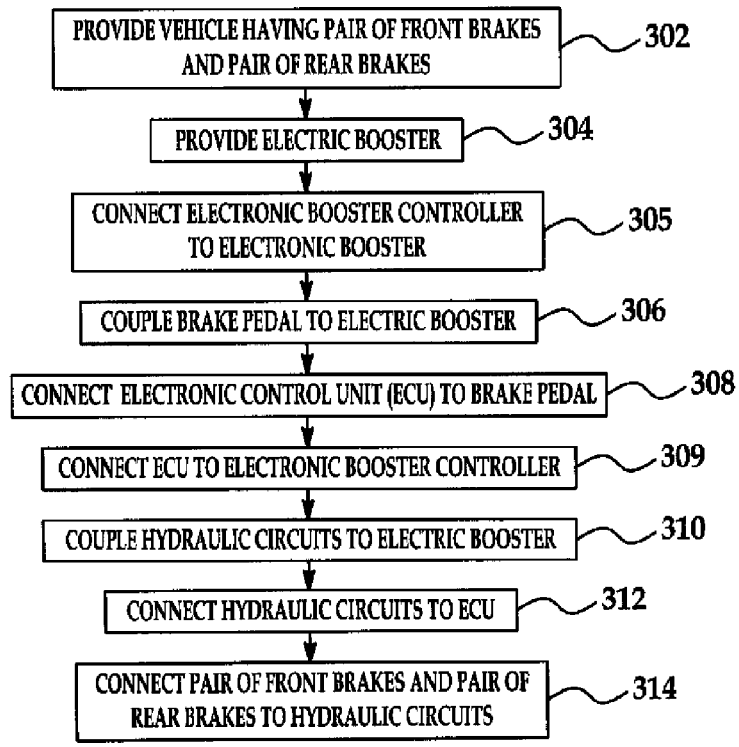
FIG. 4
FIG. 3

ELECTRONIC BRAKE ACTUATOR BRAKE-BY-WIRE SYSTEM AND METHOD

CROSS-REFERENCE TO RELATED APPLICATIONS

This application is related to application Ser. No. 12/702,378, filed Feb. 9, 2010 and entitled "Electro-Hydraulic Brake Brake-By-Wire System and Method", and Ser. No. 12/702,366, filed Feb. 9, 2010 and entitled "Electro-Hydraulic Brake-By-Wire System and Method".

TECHNICAL FIELD

The disclosure generally relates to brake-by-wire systems for vehicles. More particularly, the disclosure relates to an electronic brake actuator brake-by-wire system having an electronic booster, and an electronic brake actuator brake-by-wire method.

BACKGROUND

Full hybrid vehicles may have brake-by-wire systems to facilitate coordinated or series regenerative braking. Brake-by-wire system architectures in production generally fall under one of 3 categories: electromechanical systems, which utilize electronic calipers; electro-hydraulic systems, which typically utilize a high-pressure accumulator with analog hydraulic valves to generate pressure that is applied to individual or multiple wheels; and active booster based systems, which utilize an active boosters (either vacuum or hydraulic) to generate controlled boosted hydraulic pressure, via a conventional brake master cylinder, that is applied to the wheel or wheels. These system architectures each have advantages and disadvantages in areas such as cost, packaging, durability and complexity. For example, the vacuum-based brake-by-wire system may be characterized by lower cost with some functional advantages but may lack other functionalities that the other systems provide. The vacuum-based brake-by-wire system typically requires an active booster in conjunction with a vacuum supply (electric vacuum pump) and a pedal-mounted brake feel simulator unit. This arrangement may prevent independent front/rear braking pressure control and may have other disadvantages as well.

Therefore, an electronic brake actuator brake-by-wire system and method are needed in which the active vacuum booster and vacuum pump of a vacuum-based brake-by-wire system may be replaced with an electronic booster including a brake pedal with an integrated pedal feel simulator to provide cost, package and functional improvements.

SUMMARY

The disclosure is generally directed to an electronic brake actuator brake-by-wire system. An illustrative embodiment of the system includes a brake pedal, an electronic booster coupled to the brake pedal, a master cylinder coupled to the electronic booster, at least one hydraulic brake circuit disposed in fluid communication with the master cylinder, at least one front hydraulic brake disposed in fluid communication with the at least one hydraulic brake circuit and at least one rear hydraulic brake disposed in fluid communication with the at least one hydraulic brake circuit.

The disclosure is further generally directed to a vehicle, which includes an electronic brake actuator brake-by-wire system. An illustrative embodiment of the vehicle includes a chassis; a front axle and a rear axle carried by the chassis, a front pair of wheels and a rear pair of wheels carried by the front axle and the rear axle, respectively; and a drive mechanism drivingly engaging at least one of the front axle and the rear axle. The vehicle further includes an electronic brake actuator brake-by-wire system comprising a brake pedal, a pedal feel simulator coupled to the brake pedal, an electronic booster coupled to the brake pedal, a master cylinder coupled to the electronic booster, at least one hydraulic brake circuit disposed in fluid communication with the master cylinder, at least one front hydraulic brake disposed in fluid communication with the at least one hydraulic brake circuit and adapted to engage at least one of the front pair of wheels and at least one rear hydraulic brake disposed in fluid communication with the at least one hydraulic brake circuit and adapted to engage at least one of the rear pair of wheels.

The disclosure is further generally directed to an electronic brake actuator brake-by-wire system method. An illustrative embodiment of the method includes providing a vehicle having a pair of front brakes and a pair of rear brakes; providing an electronic booster; coupling a brake pedal to the electronic booster; coupling a pedal feel simulator to the brake pedal; coupling at least one hydraulic circuit to the electronic booster; connecting at least one of the pair of front brakes to the at least one hydraulic circuit; and connecting at least one of the pair of rear brakes to the at least one hydraulic circuit.

BRIEF DESCRIPTION OF THE DRAWINGS

The disclosure will now be made, by way of example, with reference to the accompanying drawings, in which:

FIG. 2 is a schematic diagram of a vehicle fitted with an illustrative embodiment of the electronic brake actuator brake-by-wire system.

FIG. 3 is a flow diagram of an illustrative embodiment of an electronic brake actuator brake-by-wire method.

FIG. 4 is a flow diagram of an illustrative embodiment of a method of operating an electronic brake actuator brake-by-wire system.

DETAILED DESCRIPTION

Figure 1:
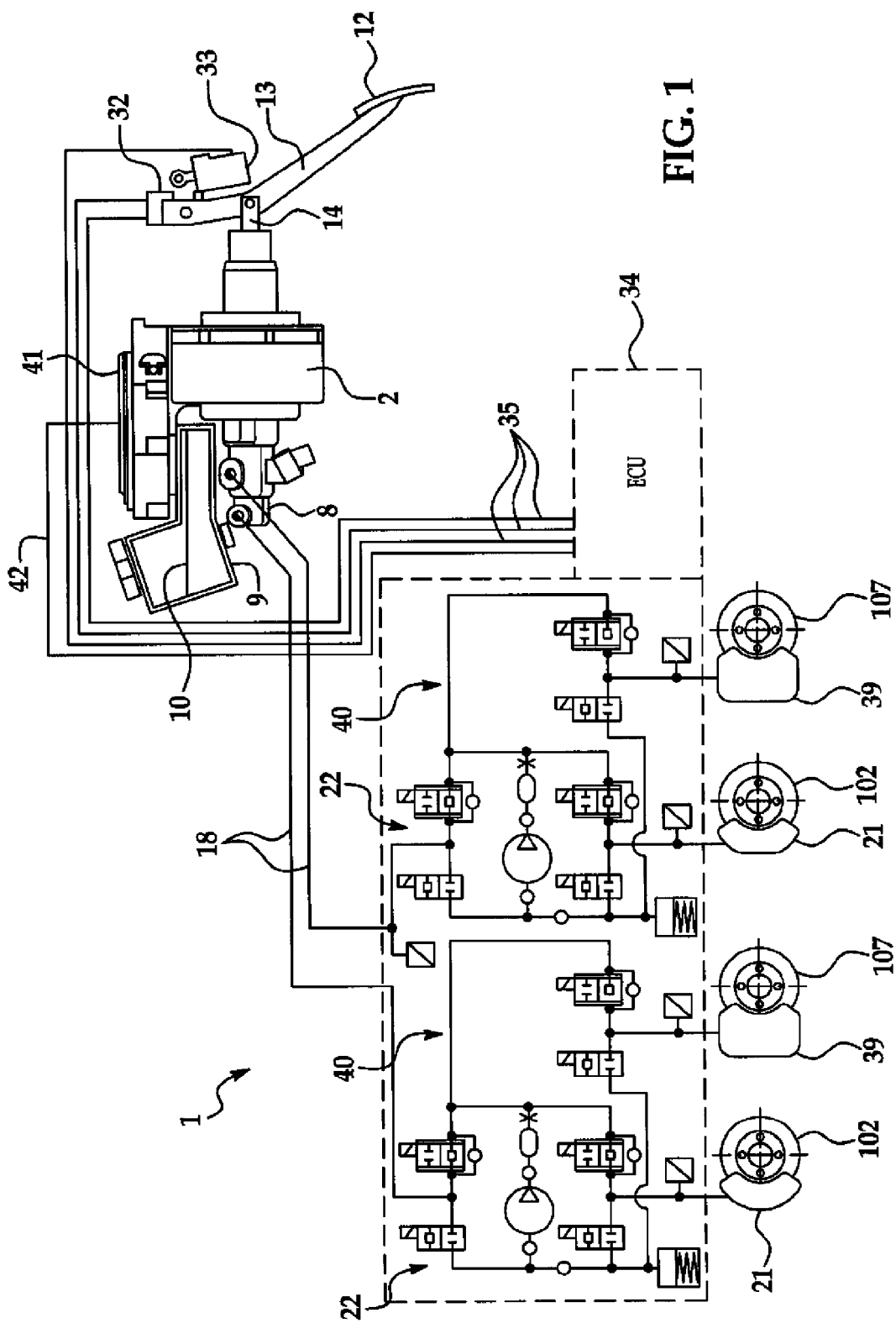
FIG. 1 is a schematic diagram of an illustrative embodiment of the electronic brake actuator brake-by-wire system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Referring initially to FIGS. 1 and 2, an illustrative embodiment of the electronic brake actuator brake-by-wire system, hereinafter system, is generally indicated by reference numeral 1. As shown in FIG. 2, the system 1 may be suitable for implementation in conjunction with an electric vehicle 100 such as a plug-in hybrid electric vehicle (HEV), for example and without limitation. Generally, the electric vehicle 100 may include a vehicle chassis 104 having a front axle 101 and a rear axle 106. The front axle 101 may be fitted with a pair of front wheels 102. The rear axle 106 may be fitted with a pair of rear wheels 107.

An internal combustion engine 103 may drivingly engage at least one of the front axle 101 and the rear axle 106. An electric motor 108 may additionally or alternatively drivingly engage at least one of the front axle 101 and the rear axle 106. A rechargeable battery (not shown) may be connected to the electric motor 108. The rechargeable battery may be capable of being recharged with electrical power at a charging destination (not shown) via suitable plug-in electrical equipment, as is known to those skilled in the art. The electric vehicle 100 may be adapted for propulsion by the front wheels 102 via the front axle 101 and/or by the rear wheels 107 via the rear axle 106 through engagement of the internal combustion engine 103. The electric vehicle 100 may additionally or alternatively be adapted for propulsion by the front wheels 102 via the front axle 101 and/or by the rear wheels 107 via the rear axle 106 through engagement of the electric motor 108. As will be hereinafter further described, the system 1 may be operable to apply hydraulically-actuated brake pressure to the front wheels 102 and the rear wheels 107 of the vehicle 100.

As shown in FIG. 1, the system 1 may include an electronic booster 2. An example of an electronic booster which is suitable for the purpose is that which is disclosed in U.S. Pat. No. 6,634,724, which is incorporated by reference herein in its entirety. A master cylinder 8 may be coupled to the electronic booster 2. A hydraulic fluid reservoir 9 which contains a supply of hydraulic fluid 10 may be disposed in fluid communication with the master cylinder 8. A brake pedal 12 of the vehicle 100 may be provided on an elongated pedal arm 13 which is coupled to the electronic booster 2 through a push rod 14. An example of pedal feel simulator incorporated into the brake pedal arm 13 which is suitable for the purpose is that which is disclosed in U.S. Pat. App. No. 20080196983, which is incorporated by reference herein in its entirety.

A pair of front hydraulic brake circuits 22 and a pair of rear hydraulic brake circuits 40 may be disposed in fluid communication with the master cylinder 8 through respective hydraulic lines 18. The front hydraulic brake circuits 22 may be operably connected to a pair of front hydraulic brakes 21, respectively, which may be adapted to apply hydraulically-actuated brake pressure to the respective front vehicle wheels 102 of the vehicle 100 (FIG. 2), as will be hereinafter further described. The rear hydraulic circuits 40 may be operably connected to a pair of front hydraulic brakes 21, respectively, which may be adapted to apply hydraulically-actuated brake pressure to the respective rear vehicle wheels 107 of the vehicle 100.

A pedal travel or angle sensor 32 may be coupled to the pedal arm 13. An electronic control unit (ECU) 34 may be connected to the pedal travel sensor 32 through ECU wiring 35. The ECU 34 may additionally be connected to the valves, pumps and other various control components (not labeled) of each of the front hydraulic brake circuits 22 and each of the rear hydraulic brake circuits 40. The ECU 34 may additionally be connected to the electronic booster controller 41 through electronic booster wiring 42. A pedal feel simulator 33 may additionally be provided on the pedal arm 13 and may or may not be connected to the ECU 34 through ECU wiring 35. An example of pedal feel simulator 33 and pedal travel sensor 32 incorporated into the brake pedal arm 13 which is suitable for the purpose is that which is disclosed in U.S. Pat. App. No. 20080196983, which is incorporated by reference herein in its entirety.

In operation of the vehicle 100, the internal combustion engine 103 and/or the electric motor 108 applies torque to the front wheels 102 through the front axle 101 and/or to the rear wheels 107 through the rear axle 106 to propel the vehicle 100 on a surface (not shown). Braking is applied to the vehicle 100 as a vehicle operator (not shown) applies pressure to the brake pedal 12. Accordingly, the pedal arm 13 actuates the electronic booster 2 of the system 1 through the pushrod 14. In turn, the electronic booster 2 pressurizes hydraulic fluid 10 in the master cylinder 8 and facilitates flow of the hydraulic fluid 10 from the master cylinder 8, through the hydraulic lines 18 and the respective front hydraulic brake circuits 22 and rear hydraulic brake circuits 40.

The hydraulic fluid 10 which flows through the front hydraulic brake circuits 22 causes the front hydraulic brakes 21 to apply brake pressure against the respective front wheels 102. Simultaneously, the hydraulic fluid 10 which flows through the rear hydraulic brake circuits 40 causes the rear hydraulic brakes 39 to apply brake pressure against the respective rear wheels 107. The pedal arm 13 also actuates the pedal travel sensor 32, which transmits an activation signal (not shown) to the ECU through the ECU wiring 35. Depending on the functionality of the system 1, the ECU 34 controls the valves, pumps and other components (not indicated) of each of the front hydraulic brake circuits 22 and the rear hydraulic brake circuits 40 to facilitate flow of hydraulic fluid through the front hydraulic brake circuits 22 to each front hydraulic brake 21 and through the rear hydraulic brake circuits 40 to each rear hydraulic brake 39. Said functionality may include but are not limited to anti-lock brake control (ABS), electronic stability control (ESC), roll stability control (RSC), hill launch assist (HLA), or any other advanced brake function know to those skilled in the art. It may be noted that although controls of system 1 has been described to be provided by ECU 34, the controls may be distributed to one of many separate controllers not shown. The resulting brake force which is applied to the front wheels 102 and the rear wheels 107 slows or stops the vehicle 100. As the brake pedal 12 is depressed during braking, the pedal feel simulator 33 may simulate mechanical resistance of the brake pedal 12 in proportion to the magnitude of braking which is applied.

The ECU 34 also may be configured to actuate the electronic booster 2 independent of any travel from brake pedal 12. This capability may be necessary to provide autonomous braking needed for other advanced braking functions such as, but not limited to, adaptive cruise control (ACC), coordinated regenerative braking or other functions known to those skilled in the art. It may be noted that the application of such functions may require providing the means to decouple the brake pedal arm 13 or pushrod 14 from the electronic booster 2 such that movement of the pedal arm 13 does not necessarily result in mechanical coupling or input to electronic booster 2 or operation of electronic booster 2 does not necessarily result in the movement of pedal arm 13. An example of a feature which allows decoupling of pedal arm 13 from booster 2 which is suitable for the purpose is that which is disclosed in U.S. Pat. App. No. 20080196983, which is incorporated by reference herein in its entirety.

It will be appreciated by those skilled in the art that the system 1 offers numerous benefits including cost, package and functional improvements over conventional brake-by-wire vacuum brake systems which require an active vacuum booster and vacuum pump. The system 1 may utilize common ABS/ESC controls which are common to conventional vacuum brake systems. Moreover, use of the electronic booster 2 may facilitate infinite tuning of the simulator 33 to brake feel as the brake pedal 12 is depressed during braking. The ECU 34 and control (pump and motor) components (not labeled) of the hydraulic brake circuits 22, 40 may be part of a stability control system which provides backup braking to the vehicle 100.

The electronic booster 2 may be of the type which utilizes an electronic motor (not shown) with a ball screw actuator (not shown) to build hydraulic pressure in the master cylinder 8. This arrangement may provide enhanced braking response over that which can be attained using an active vacuum booster and vacuum pump of a vacuum-based brake-by-wire system.

Referring next to FIG. 3, a flow diagram 300 of an illustrative embodiment of an electronic brake actuator brake-by-wire method is shown. In block 302, a vehicle having a pair of front brakes and a pair of rear brakes is provided. In some embodiments, the vehicle may be a hybrid electric vehicle (HEV). In block 304, an electronic booster is provided. In block 305, an electronic booster controller may be coupled to the electronic booster. In block 306, the brake pedal is coupled to the electronic booster. In block 308, an electronic control unit (ECU) is connected to the brake pedal. In block 309, the ECU may be connected to the electronic booster controller. In block 310, hydraulic circuits are coupled to the electronic booster. In block 312, the hydraulic circuits are connected to the ECU. In block 314, the front brakes and the rear brakes of the vehicle are connected to the hydraulic circuits.

Referring next to FIG. 4, a flow diagram 400 of an illustrative embodiment of a method of operating an electronic brake actuator brake-by-wire system is shown. In block 402, a vehicle is provided. In some applications, the vehicle may be a hybrid electric vehicle. In some applications, the vehicle may have a pair of front brakes and a pair of rear brakes; an electronic booster; a brake pedal selectively coupled to the electronic booster; at least one hydraulic circuit coupled to the electronic booster; at least one of the pair of front brakes connected to the at least one hydraulic circuit; and at least one of the pair of rear brakes connected to the at least one hydraulic circuit. In block 404, the vehicle is operated. In block 406, pressure is applied to the brake pedal of the vehicle. In block 408, the front brakes of the vehicle are actuated. In block 410, the rear brakes of the vehicle are actuated. In some embodiments, an electronic booster controller may be coupled to the electronic booster and an electronic control unit may be connected to the electronic booster controller.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An electronic brake actuator system, comprising:
   a brake pedal;
   an electronic booster mechanically coupled to said brake pedal by a pushrod, said electronic booster electrically driven;
   a master cylinder coupled to said electronic booster;
   at least one hydraulic brake circuit disposed in fluid communication with said master cylinder;
   at least one pair of front hydraulic brakes disposed in fluid communication with said at least one front hydraulic brake circuit;
   at least one pair of rear hydraulic brakes disposed in fluid communication with said at least one rear hydraulic brake circuit;
   an electronic control unit electrically connected to and configured to control said electronic booster via electrical inputs, said electronic control unit further operably connected to said at least one front and rear hydraulic brake circuits, said at least one front and rear hydraulic brake circuits configured to facilitate flow of hydraulic fluid through said at least one front hydraulic brake circuit to each of said at least one pair of front hydraulic brakes and through said at least one rear hydraulic brake circuit to each of said at least one pair of rear hydraulic brakes;
   a pedal travel or angle sensor directly mechanically coupled to said brake pedal, said pedal travel or angle sensor electrically connected to said electronic control unit, said pedal travel or angle sensor configured to transmit an activation signal to said electronic control unit, said electronic control unit configured to actuate said at least one pair of front hydraulic brakes and said at least one pair of rear hydraulic brakes through said respective front and rear hydraulic brake circuits responsive to said activation signal;
   a pedal feel simulator engaged by said brake pedal and electrically connected to said electronic control unit; and
   said electronic control unit further configured to actuate said electronic booster independent of travel from said brake pedal, wherein means is provided such that said brake pedal is mechanically decoupled from said pushrod and said electronic booster.

2. The system of claim 1 further comprising a pedal arm coupled to said electronic booster and wherein said brake pedal is carried by said pedal arm.

3. The system of claim 2 further comprising an electronic booster controller provided on said electronic booster and wherein said electronic control unit is connected to said electronic booster controller.

4. The system of claim 2 further comprising a pedal/booster coupling selectively connecting said pedal arm to said electronic booster.

5. The system of claim 1 wherein said at least one hydraulic brake circuit comprises a pair of front hydraulic brake circuits and a pair of rear hydraulic brake circuits and said at least one front hydraulic brake comprises a pair of front hydraulic brakes connected to said pair of front hydraulic brake circuits, respectively, and said at least one rear hydraulic brake comprises a pair of rear hydraulic brakes connected to said pair of rear hydraulic brake circuits, respectively.

6. A vehicle, comprising:
   a chassis;
   a front axle and a rear axle carried by said chassis;
   a front pair of wheels and a rear pair of wheels carried by said front axle and said rear axle, respectively;
   a drive mechanism drivingly engaging at least one of said front axle and said rear axle; and
   an electronic brake actuator brake system comprising:
      a brake pedal;
      an electronic booster selectively coupled to said brake pedal by a pushrod, said electronic booster electrically driven;
      a master cylinder coupled to said electronic booster;
      at least one front and rear hydraulic brake circuits disposed in fluid communication with said master cylinder;
      at least one pair of front hydraulic brakes disposed in fluid communication with said at least one front hydraulic brake circuit and adapted to engage at least one of said front pair of wheels;
      at least one pair of rear hydraulic brakes disposed in fluid communication with said at least one rear hydraulic brake circuit and adapted to engage at least one of said rear pair of wheels;

an electronic control unit electrically connected to and adapted to control said electronic booster via electrical inputs, said electronic control unit further operably connected to said at least one front and rear hydraulic brake circuits to facilitate flow of hydraulic fluid through said at least one front hydraulic brake circuit to each of said at least one pair of front hydraulic brakes and through said at least one rear hydraulic brake circuit to each of said at least one pair of rear hydraulic brakes;

a pedal travel or angle sensor, said pedal travel or angle sensor directly mechanically coupled to said brake pedal and electrically connected to said electronic control unit, said pedal travel or angle sensor configured to transmit an activation signal to said electronic control unit, said electronic control unit configured to actuate said at least one pair of front hydraulic brakes and said at least one pair of rear hydraulic brakes through said respective front and rear hydraulic brake circuits responsive to said activation signal;

a pedal feel simulator engaged by said brake pedal and electrically connected to said electronic control unit; and said electronic control unit further configured to actuate said electronic booster independent of travel from said brake pedal wherein means is provided such that said brake pedal is mechanically decoupled from said pushrod and said electronic booster.

7. The vehicle of claim 6 wherein said drive mechanism comprises at least one electric motor drivingly engaging at least one of said front axle and said rear axle and an internal combustion engine providing power to at least one of said front axle and said rear axle.

8. The vehicle of claim 6 further comprising a pedal arm coupled to said electronic booster and wherein said brake pedal is carried by said pedal arm.

9. The vehicle of claim 8 further comprising an electronic booster controller provided on said electronic booster and wherein said electronic control unit is connected to said electronic booster controller.

10. The system of claim 8 further comprising a pedal/booster coupling selectively connecting said pedal arm to said electronic booster.

11. The system of claim 6 wherein said at least one hydraulic brake circuit comprises a pair of front hydraulic brake circuits and a pair of rear hydraulic brake circuits and said at least one front hydraulic brake comprises a pair of front hydraulic brakes connected to said pair of front hydraulic brake circuits, respectively, and said at least one rear hydraulic brake comprises a pair of rear hydraulic brakes connected to said pair of rear hydraulic brake circuits, respectively.

12. A method of operating an electronic brake actuator brake-by-wire system, comprising:
providing a vehicle having a pair of front brakes and a pair of rear brakes, an electrically driven electronic booster, a brake pedal selectively coupled to said electronic booster by a pushrod, a pedal travel or angle sensor directly mechanically engaged by said brake pedal, at least one front and rear hydraulic brake circuits coupled to said electronic booster, at least one of said pair of front brakes connected to said at least one front hydraulic brake circuit and at least one of said pair of rear brakes connected to said at least one rear hydraulic circuit, an electronic control unit electrically connected to said pedal travel or angle sensor and configured to control said electronic booster via electrical inputs, said electronic control unit further operably connected to said at least one front and rear hydraulic brake circuits, said at least one front and rear hydraulic brake circuits respectively configured to facilitate flow of hydraulic fluid through said at least one front hydraulic brake circuit to said pair of front brakes and through said at least one rear hydraulic brake circuit to said pair of rear brakes responsive to receiving an activation signal from said pedal travel or angle sensor, and further providing a pedal feel simulator engaged by said brake pedal and electrically connected to said electronic control unit;
operating said vehicle; and
actuating said front brakes and said rear brakes by each of the following: applying pressure to said brake pedal and actuating said electronic booster independent of travel from said brake pedal wherein means is provided such that said brake pedal is mechanically decoupled from said pushrod and said electronic booster.

13. The method of claim 12 wherein said providing a vehicle comprises providing a hybrid electric vehicle.

14. The method of claim 12 wherein said providing a vehicle having at least one of said pair of front brakes connected to said at least one hydraulic brake circuit comprises providing a vehicle having both of said pair of front brakes connected to said at least one hydraulic brake circuit.

15. The method of claim 14 wherein said providing a vehicle having at least one of said pair of rear brakes connected to said at least one hydraulic brake circuit comprises providing a vehicle having both of said pair of rear brakes connected to said at least one hydraulic brake circuit.

16. The method of claim 12 wherein said providing a vehicle comprises providing a vehicle having an electronic booster controller coupled to said electronic booster and an electronic control unit connected to said electronic booster controller.

* * * * *